United States Patent [19]

Frias

[11] 4,380,297
[45] Apr. 19, 1983

[54] PIPE STORAGE SYSTEM

[75] Inventor: Robert Frias, Odessa, Tex.

[73] Assignee: Ingram Corporation, New Orleans, La.

[21] Appl. No.: 125,159

[22] Filed: Feb. 27, 1980

[51] Int. Cl.³ .......................... B65G 1/10; E21B 19/14
[52] U.S. Cl. ...................................... 211/60 S; 414/22
[58] Field of Search ........................... 414/745, 22, 43; 211/60 S

[56] References Cited

U.S. PATENT DOCUMENTS

| 2,311,933 | 2/1943 | Deckard | 211/60.5 |
| 2,958,430 | 11/1960 | Robishaw | 414/22 |
| 3,365,085 | 1/1968 | Wilson | 414/22 |
| 3,404,741 | 10/1968 | Gheorghe | 414/22 |
| 3,563,392 | 2/1971 | Wilson | 211/60 S |
| 3,616,941 | 11/1971 | Walling | 414/22 |
| 3,844,420 | 10/1974 | Walling | 414/22 |
| 3,870,165 | 3/1975 | Besijn | 414/22 |
| 3,978,994 | 9/1976 | Woolslayer | 414/22 |
| 4,063,653 | 12/1977 | Halada | 414/745 |

Primary Examiner—John E. Murtagh
Attorney, Agent, or Firm—Lalos, Leeds, Keegan, Lett & Marsh

[57] ABSTRACT

A storage system for securely holding lengths of pipe or the like and which comprises a plurality of pairs of rails having ends removably coupled to a pair of stanchions at different levels for holding a plurality of rows of pipe. Means is provided for removably connecting together the ends of the resulting two vertical rows of rails opposite the stanchions for securely holding the pipe and to allow the pipe to be removed and restacked. The storage system is capable of receiving modules of pipe.

28 Claims, 26 Drawing Figures

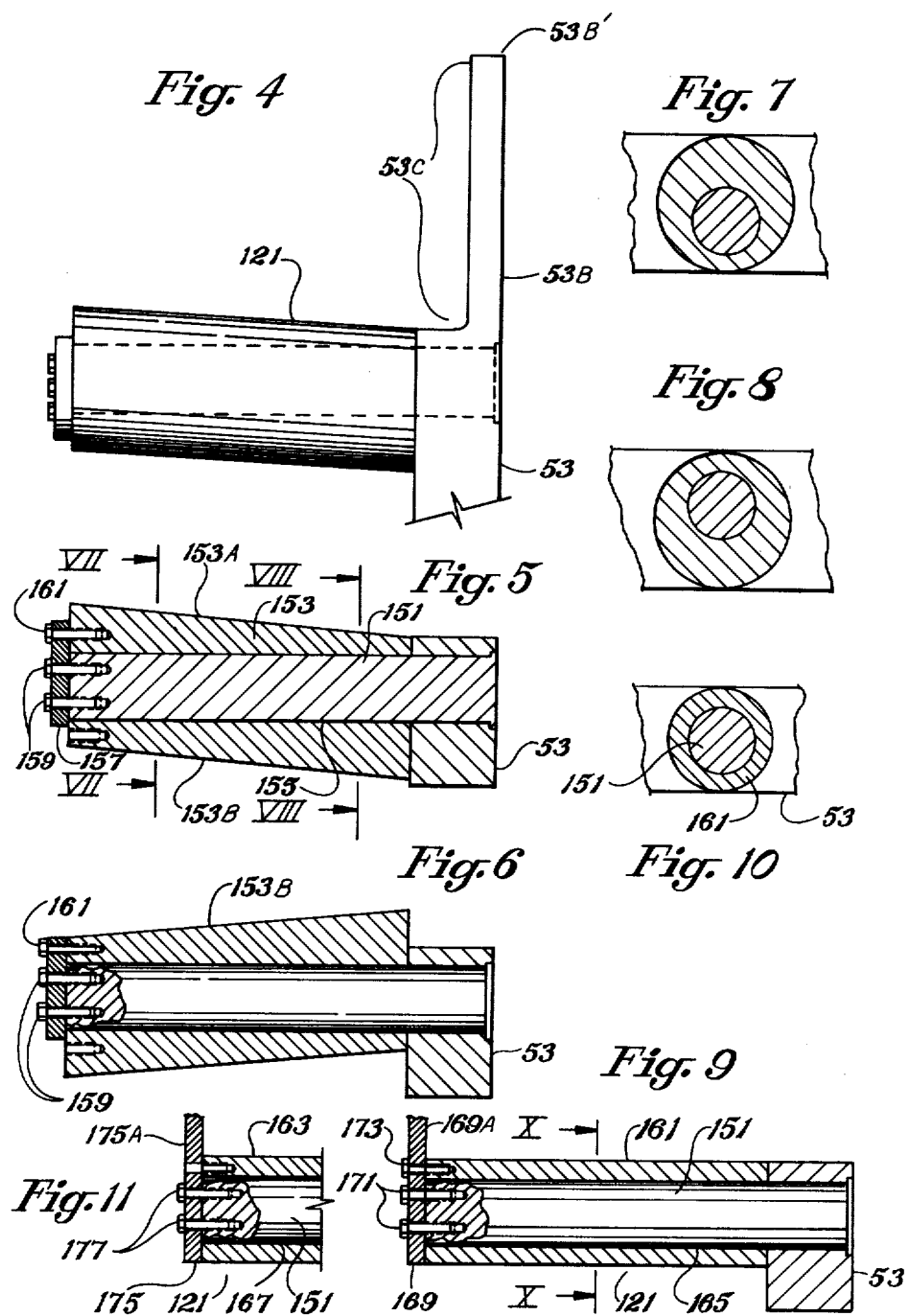

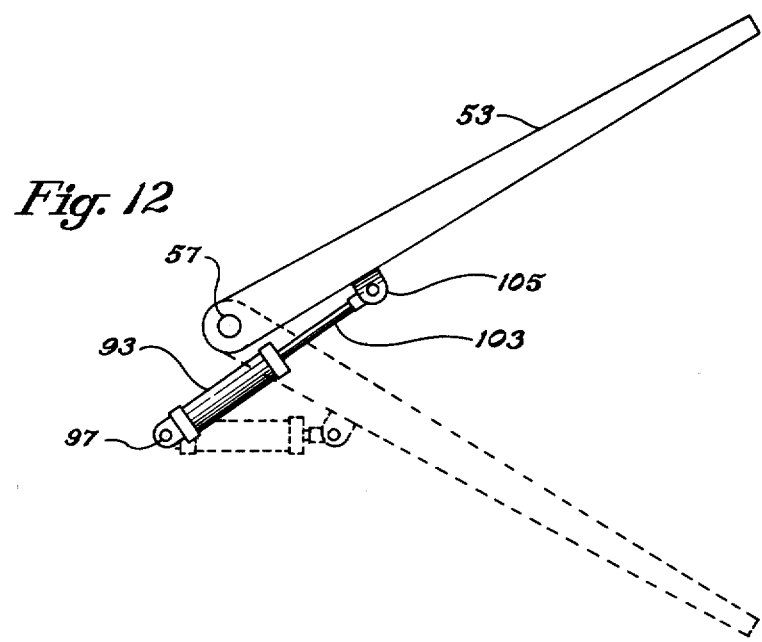
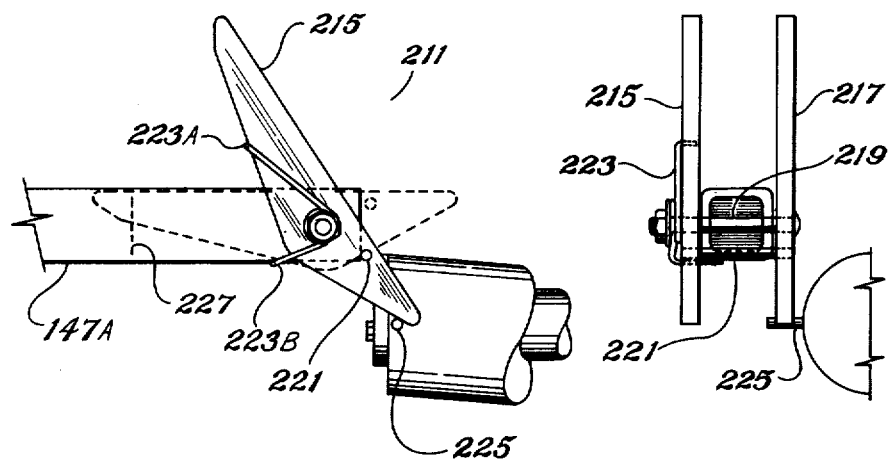

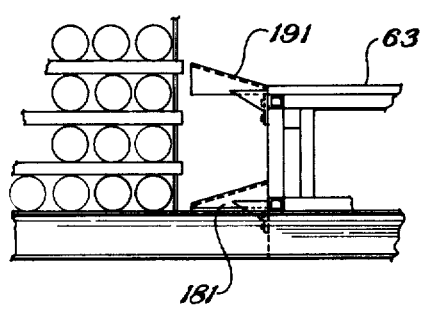
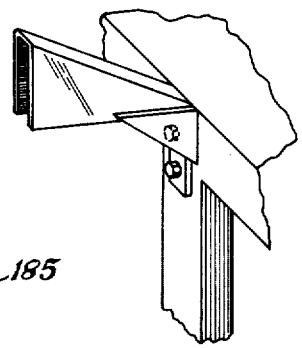
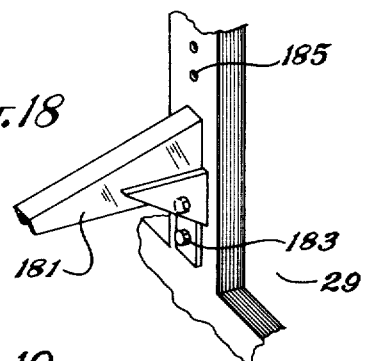
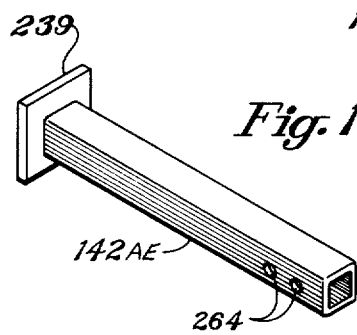
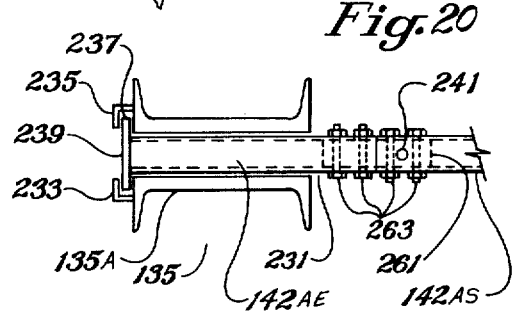
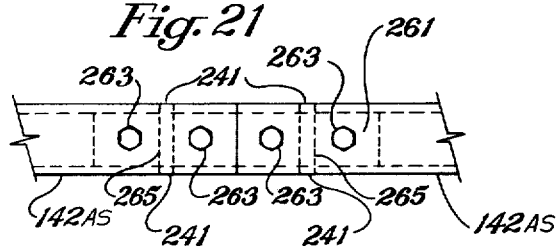
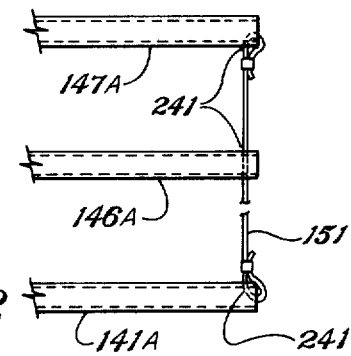

4,380,297

PIPE STORAGE SYSTEM

FIELD OF THE INVENTION

The present invention relates to a system for storing rows of pipe or the like.

DESCRIPTION OF THE PRIOR ART

In offshore drilling platforms and on drilling vessels, a need exists for an efficient storage system for securely storing pipe such as casing, drill pipe, collars or tubing. A need also exists for a system which allows pipe to be efficiently transported to the well site by carrier and transferred from the carrier to the storage system.

SUMMARY OF THE INVENTION

It is an object of the present invention to provide a storage system for securely holding lengths of pipe or the like, and which may be efficiently used to allow pipe to be removed or restacked.

It is a further object of the present system to provide a pipe storage system capable of receiving modules of pipe which facilitate the transportation of the pipe to the well site and which also facilitates transfer of the pipe from the carrier to the storage system.

BRIEF DESCRIPTION OF THE DRAWINGS

FIG. 4 is a side view of a pipe supporting lug with an eccentric sleeve, connected to one of the arms of the pipe transfer system of FIGS. 1–3. The view of FIG. 4 is an end view of the arm with the arm at an angle as shown in FIG. 1.

FIG. 5 is a cross-sectional view of the lug and arm of FIG. 4 as seen when the arm is horizontal.

FIG. 6 is a cross-section of the lug of FIG. 4 with its eccentric sleeve indexed 180° from that shown in FIG. 5.

FIG. 7 is a cross-section of FIG. 5 taken along the lines of 7—7 thereof.

FIG. 8 is a cross-section of FIG. 5 taken along the lines of 8—8 thereof.

FIG. 9 is a cross-sectional view of a pipe supporting lug with a concentric sleeve connected to one of the arms of the pipe transfer system of FIGS. 1–3.

FIG. 10 is a cross-section of FIG. 9 taken along the lines 10—10 thereof.

FIG. 11 is a partial cross-sectional view of a pipe supporting lug with a rotatable concentric sleeve.

FIG. 12 illustrates a hydraulic cylinder for operating one of the arms of the pipe transfer system of FIGS. 1–3.

FIG. 14 illustrates a gate coupled to the end of the upper pipe supporting rail of the rack of FIG. 3 on the left.

FIG. 15 is an end view of the gate of FIG. 14.

FIG. 16 illustrates pipe ramps connected to the side of the pipe handling apparatus of FIG. 1.

FIG. 17 is a perspective view of the upper ramp of FIG. 16.

FIG. 18 is a perspective view of the lower ramp of FIG. 16.

FIG. 19 illustrates a short rail member which forms part of one of the pipe supporting rails of the racks of FIGS. 1 and 3.

FIG. 20 is a top view of a stanchion guide for slidably holding the pipe supporting rails of the racks of FIGS. 1 and 3.

FIG. 21 illustrates a coupling member for removably coupling together rail members for forming the pipe supporting rails of the rack of FIGS. 1 and 3.

FIG. 22 illustrates the free ends of a vertical row of the rails of the rack of FIG. 3 tied together.

DESCRIPTION OF THE PREFERRED EMBODIMENTS

Figure 1:
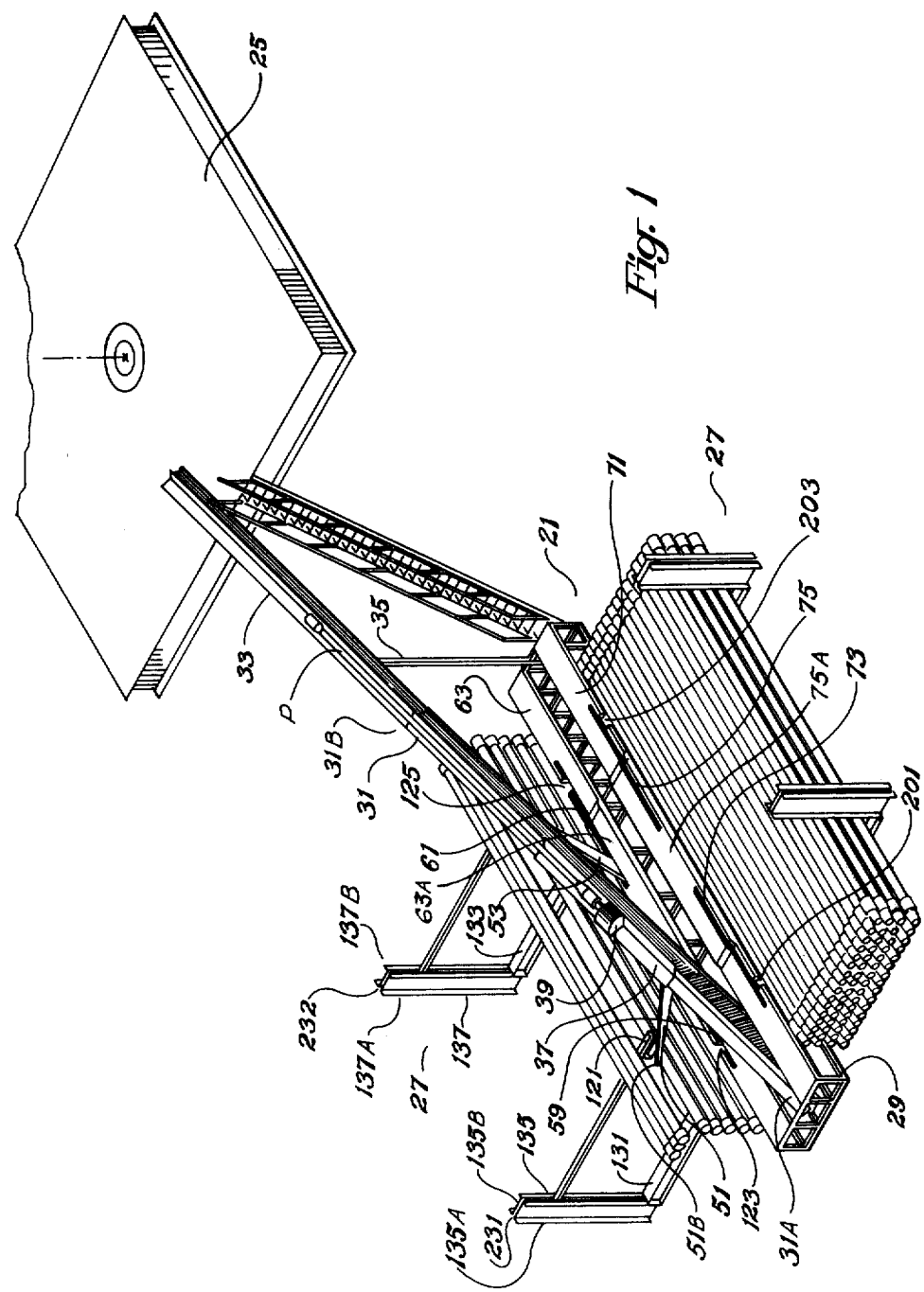
FIG. 1 is a perspective view of a pipe handling apparatus with a pipe transfer system located on one side of the apparatus next to a pipe rack.
Figure 2:
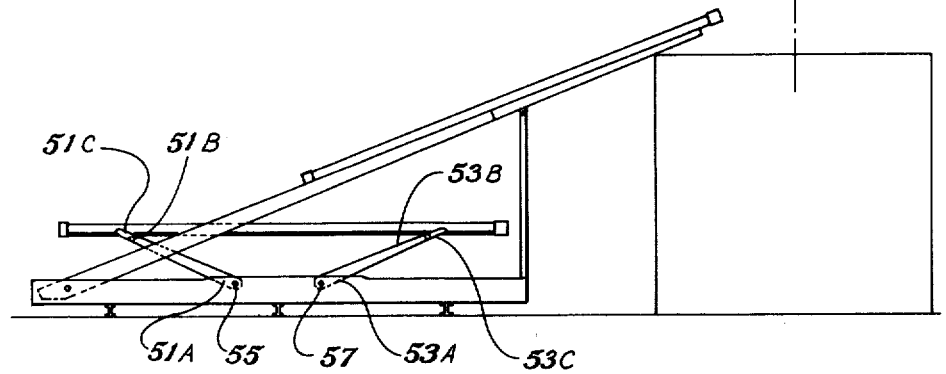
FIG. 2 is a partial side view of the pipe handling apparatus and pipe transfer system of FIG. 1.
Figure 3:
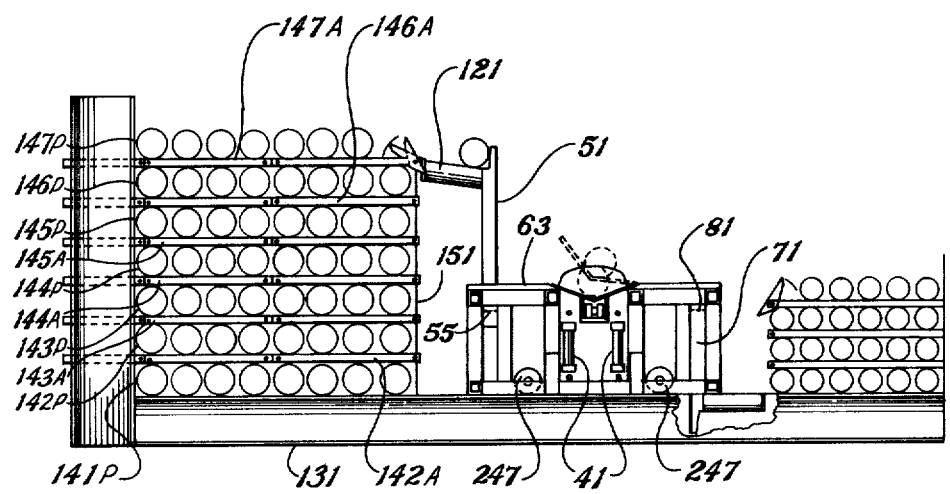
FIG. 3 is an end view of the pipe transfer system of FIG. 1, illustrating its position between a pipe rack and the pipe handling apparatus.

Referring now to FIGS. 1–3 there will be described first the pipe handling apparatus 21 for raising pipe P such as casing, drill pipe, collars, or tubing up to a derrick floor 25 of a drilling rig (not shown) or for removing the pipe 23 from the derrick floor 25. The pipe P is stored in racks 27 on both sides of the apparatus 21. The apparatus 21 comprises an elongated frame 29 which supports a trough 31 which may be moved upward to an inclined position in alignment with a fixed trough 33 as shown in FIGS. 1 and 2 or downward to a horizontal position as shown in FIG. 3. The fixed trough 33 is supported in an inclined position by the derrick floor 25 and support structure 35. The trough 31 comprises a tiltable portion 37 which may be tilted about its axis in either direction when the trough 31 is horizontal, to dump pipe on either side of the apparatus for storage in the racks 27. Also provided is a carriage 39 driven by an endless chain (not shown) for movement along trough 31 in either direction between its ends 31A and 31B.

When it is desired to move pipe from either of the racks 27 upward to the derrick floor 25, the following operations take place. The trough 31 is located in its horizontal position and the carriage 39 is located at the rear end 31A of the trough 31. A length of pipe is transferred from one of the racks 27 into the trough 31. Trough 31 next is raised to be in alignment with fixed trough 33. The endless chain drive for carriage 39 is actuated to move carriage 39 up the trough 31 to its end 31B carrying the pipe with it. The carriage pushes the pipe 23 to an upward position until its end overlies the derrick floor. The pipe then is lifted into the derrick by cable hoists and/or elevators in the derrick. The carriage 39 is retracted to the rear end 31A of the trough 31; the trough 31 lowered to a horizontal position; and the process is repeated.

In removing pipe from the derrick floor 25, the trough 31 is raised to be in alignment with fixed trough 33 and the carriage moved to an upward position along trough 31. The cable hoist locates a length of pipe in trough 31 and the carriage 39 is actuated to move the pipe downward to the lower end of trough 31. Trough 31 is lowered to a horizontal position and tiltable trough portion 37 is tilted to dump the pipe on either side of the apparatus 21 for storage in racks 27. In FIG. 2, the trough portion 37 is shown dumping the pipe 23 on the right side of the apparatus 21. Hydraulic cylinders 41 are provided for tilting the trough portion 37 in either direction along its axis.

The pipe transfer system for transferring pipe between the racks 27 and the pipe handling apparatus comprises a pair of aligned arms located on the side of the pipe handling apparatus and next to a pipe rack. In FIG. 1, one pair of arms 51 and 53 are shown on the left of the apparatus 21 next to the left rack 27. As shown in FIG. 2, the ends 51A and 51B of arms 51 and 53 are pivotally coupled to the frame 29 at 55 and 57. The arms extend through slots 59 and 61 formed through the left catwalk 63 of the apparatus 21 next to its left edge whereby the free ends 51B and 53B of the arms 51 and 53 may move to an upper position above the catwalk 63 and to a lower position below the catwalk 63. In FIG. 3, the free end of arm 51 is shown in an upper position. Although not shown in FIG. 1, a pair of arms similar to arms 51 and 53 will be located on the right side of the apparatus 21 next to the right rack. The right pair of arms have their ends pivotally coupled to the frame at the level of pivot points 55 and 57 whereby their free ends may move to an upper position above the catwalk 71 and a lower position below the catwalk. The arms of the right pair of arms extend through slots 73 and 75 formed through catwalk 71 next to its right edge. In FIG. 3, the free end of arm 77 of the right pair of arms is shown in a lower position. The free ends of arms 51 and 53 can be moved to the same lower level.

In FIG. 3, the level of the pivot point 55 of arm 51 is more accurately shown. The pivot point 57 of arm 53 is at the same level. The pivot point of the arm 77 is shown in FIG. 3 at 81.

A hydraulic system is employed for moving the free ends 51B and 53B of arms 51 and 53 together to upward or downward positions or to any level inbetween. A similar hydraulic system is employed for moving together the pair of arms on the right.

Figure 13:
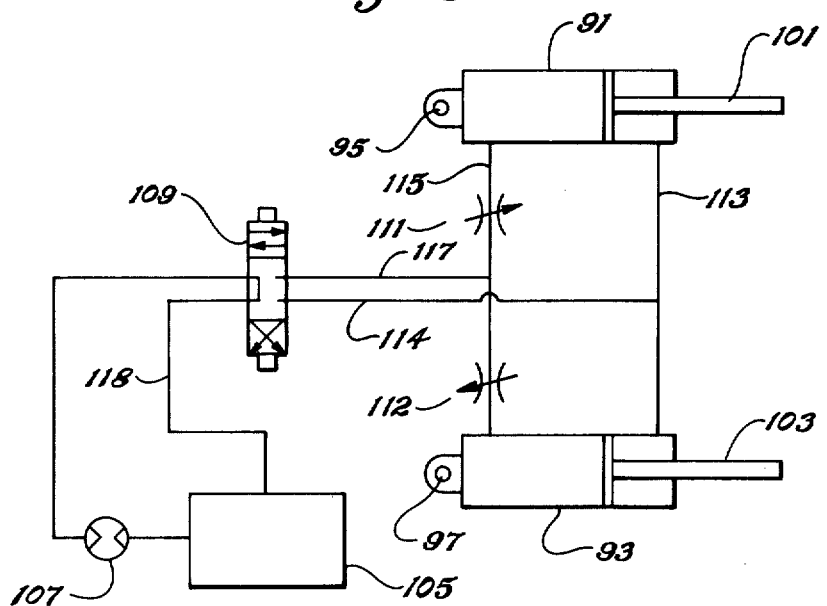
FIG. 13 schematically illustrates a dual hydraulic system for operating a pair of the arms of the pipe transfer system of FIGS. 1–3.

Referring to FIGS. 12 and 13, the hydraulic system for arms 51 and 53 will be described. It is to be understood that a similar hydraulic system will be employed for the right pair of arms. The hydraulic system for arms 51 and 53 comprise a pair of cylinders 91 and 93 having their ends pivotally coupled to the frame 29 at 95 and 97. The pistons 101 and 103 of the cylinders 91 and 93 are pivotally coupled to arms 51 and 53 respectively. In FIG. 12, the piston 103 of cylinder 93 is shown pivotally coupled to an ear 105 which is fixedly connected to arm 53. The piston 101 of cylinder 91 is pivotally coupled to its arm 51 in a similar manner. When the pistons 101 and 103 are forced outward, the free ends of arms 51 and 53 are moved upward and when the pistons 101 and 103 are moved inward, the free ends of the arms 51 and 53 are moved downward. The hydraulic system for operating the cylinders 91 and 93 comprise a hydraulic oil tank 105, a pump 107, a 4-way directional control valve 109, adjustable flow control valves 111 and 113 and flow lines 113-118. The hydraulic fluid is metered so that the pistons 101 and 103 move out together or in together.

Connected to the outer sides of each of arms 51 and 53 is a pipe supporting lug 121. Each lug is connected near but spaced inward from the very tip of the free end of its arm. For example, lug 121 of arm 53 is spaced from the very tip 53B' of the free end 53B of arm 53 about 10 or 12 inches. The portion of arms 51 and 53 from their lugs 121 to the very tip of their free ends will hereinafter be referred to as the free end extensions 51C and 53C of the arms. The lugs 121 extend outward from their arms toward the rack 27 next to the apparatus 21 on the side on which the arms are located. For example, lugs 121 of arms 51 and 53 extend toward the left rack. Vertical slots 123 and 125 are formed in the side of the frame 29 for receiving lugs 121 of arms 51 and 53 when the arms are moved to their lower positions.

Figure 24:
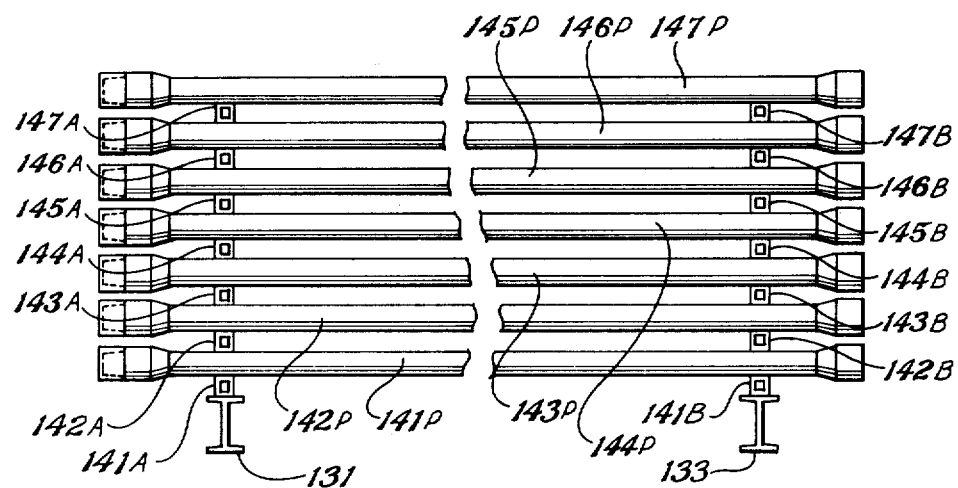
FIG. 24 is a side view of the rack of FIG. 3 on the left.

The purpose of the lugs 121 is to support a length of pipe when it is being transferred between the rack 27 and the pipe handling apparatus 21. Each rack 27 comprises two parallel I-beams 131 and 133 having a pair of upright stanchions 135 and 137 fixedly connected to their ends respectively. A plurality of pairs of rails 141A-141B, 142A-142B, 143A-143B, 144A-144B, etc. are provided for supporting a plurality of rows of pipe 141P, 142P, 143P, 144P, etc. (see FIG. 24). In FIG. 3, the lower pair of rails 141A, 141B is not shown and the lower row of pipe 141P is shown supported directly on the I-beams 131 and 133. Preferably the lower pair of rails 141A and 141B will be employed and supported on I-beams 131 and 133. The rails of each pair have one end removably coupled to the pair of stanchions 135 and 137 respectively. The other ends of each vertical row of rails 141A, 142A, 143A, 144A, etc. and 141B, 142B, 143B, 144B, etc. are connected together with straps or rods to prevent the pipe from rolling off of the rails. For example, in FIG. 21 the ends of the vertical row of rails 141A-147A opposite the stanchion 135 are shown tied together with a strap 151. Similarly, the ends of the vertical row of rails 141B-147B opposite the stanchion 137 also will be tied together with a strap. In FIG. 3, the lower end of the strap 151 is tied to the I-beam 131.

In FIG. 3, the pipe of the upper row of pipe 147P is shown in a position to be removed with the pipe transfer system and loaded in the trough 31 for transfer to the derrick floor. In the transfer process, the arms 51 and 53 are moved upward to position the lugs 121 at the level of the upper rails 145A and 147B shown in FIG. 3 and a length of pipe is rolled laterally from the top row onto the lugs 121. The arms 51 and 53 then are lowered to a horizontal level where their top surfaces are level with the catwalk 63. The free end extensions 51C and 53C of the arms prevent the pipe from rolling off of the lugs until the arms are level with the catwalk 63. The pipe then is rolled across the catwalk 63 onto the trough 31. The arms then are raised again and the next pipe transferred to the trough. The process is repeated until the top row of pipe is removed at which time the pair of rails 147A, 147B is removed and the pipe of the next row of pipe sequentially transferred to the trough. When the row of pipe 143P is reached, the arms 51 and 53 move down and then up to sequentially transfer its pipe to the trough 31. Similarly when transferring pipe from the rows of pipe below row 143P, the arms 51 and 53 move down and then up to sequentially transfer pipe to the trough 31.

Referring to FIGS. 4-8, each of the lugs 121 for the arms 51 and 53 in one embodiment comprises a shaft 151 fixedly secured to the arm with a sleeve 153 eccentrically located around the shaft. As seen the sleeve has a central aperture 155 eccentrically formed therethrough relative to its edges 153A and 153B for receiving the shaft. The sleeve may be located in the position shown in FIG. 5 relative to the shaft and arm or indexed 180° and located in the position shown in FIG. 6 relative to the shaft and arm. The sleeve is securely held in either position by end plate 157 and bolts 159 and 161. The bolt 161 is removable to allow indexing to take place. When the sleeve is located in the position shown in FIG. 5, its top edge or surface 153A slants from its outer edge downward toward the arm. When the sleeve is located in the position shown in FIG. 6, its top edge or surface 153B slants from its arm downward toward its outer edge.

When the arms 51 and 53 are employed for transferring pipe from the rack to the trough 31, the sleeves 153 of their lugs are located in the position shown in FIG. 5. When a length of pipe is rolled from a row of pipe (above the catwalk 63) onto the lugs when the arms are in the upper positions the pipe will roll down the inclined upper surfaces of the sleeves and be stopped by the free end extensions 51B and 53B of the arms 51 and 53. As the arms are lowered to horizontal positions with their top edges level with the catwalk 63, the free end extensions will become horizontal and the upper inclined surfaces of the sleeves 153 will cause the pipe to roll across the catwalk 63 into the trough 31. When a length of pipe is rolled from a row of pipe (below the catwalk 63) onto the lugs when the arms are in the lower positions the pipe will roll down the inclined upper surfaces of the sleeves and butt up against the side of the frame 29 of the apparatus 21. The arms 51 and 53 are raised until they reach their horizontal position level with the catwalk 63. The upper inclined surfaces of the sleeves 153 will cause the pipe to roll across the catwalk 63 into the trough 31.

The lugs 121 also are employed for transferring pipe from the trough 31 to the rack 27 when stacking to an upper level above the catwalk 63. In this instance, the sleeves 153 of the lugs 121 of arms 51 and 53 will be located in the position shown in FIG. 6. In unloading pipe from the trough 31, the top edges of the arms 51 and 53 will be horizontal and about level with the catwalk 63. The trough portion 37 will be tilted to dump the pipe onto the lugs 121 of the arms. The inclined upper surfaces 153B of the sleeves 153 will cause the pipe to butt up against the stack of pipe on the rack until the upper row or level of the rack is reached at which time the pipe will roll from the lugs onto the upper row of the rack.

When the pipe is being unloaded from the trough 31 to the rack and when stacking to a lower level below the catwalk 63, the embodiment of FIGS. 9–11 and 18 preferably will be used. In this embodiment, each lug 121 of the arms 51 and 53 will comprise a shaft 151 fixedly secured thereto with a concentric sleeve located around the shaft. In FIGS. 9 and 10, the concentric sleeve of arm 53 is shown at 161 and in FIG. 11 a portion of the concentric sleeve of arm 51 is shown at 163. The sleeves 161 and 163 are cylindrical having cylindrical apertures 165 and 167 formed along their axes respectively. Sleeve 161 is fixedly held in place to the shaft 151 of arm 53 by an end plate 169 and bolts 171 and 173. The end plate 169 has an upward extension 169A which extends above the upper surface of sleeve 161. Sleeve 163 of arm 51 is held in place by end plate 175 and bolts 177. The sleeve 163, however, is not bolted to the end plate 175 and is allowed to rotate about its shaft 151. The end plate 175 has an upward extension 175A which extends above the upper surface of sleeve 163.

Also provided are two ramps 181 which are adapted to be attached to the side of the frame 29 of the apparatus at spaced apart positions. The ramps 181 slant downward toward the rack. One of the ramps is shown at 181 in FIGS. 16 and 18. The two ramps 181 will be attached to the side of the frame 29 at the same level below the catwalk 63. Bolts or pegs 183 are employed for attaching the ramps to the side of the frame 29. A plurality of vertical apertures 185 are provided in the frame 29 for allowing the pair of ramps 181 to be attached to the frame at different levels depending upon the level of the stack of pipe to which pipe is being transferred.

Assume that pipe is to be transferred from the trough 31 and stacked on the lowest level of the rack. The arms 51 and 53 are located between the I-beams 131 and 133 such that when they are in their lowest positions, their lugs 121 including the end plate extensions 169A and 175A will be below the level of the I-beams 131 and 133 as shown with respect to the right pair of arms in FIG. 3. The ramps 181 will be located in the position shown in FIG. 16. The arms 51 and 53 will be located in horizontal positions level with the catwalk 63. The pipe in the trough will be dumped onto the lugs by tilting the tilting portion 37 of the trough. Extensions 169A and 175A of the lugs will prevent the pipe from rolling off of the lugs until the lugs reach the ramps 181 and are moved below the ramps. The ramps 181 then will cause the pipe to roll onto the lowest level of the rack. When stacking onto the next level of the rack, the ramps 181 are merely moved up a suitable distance.

The purpose of having one sleeve 161 fixed and the other sleeve 163 rotatable is to prevent the pipe from moving longitudinally on the lugs as the arms are pivoted thereby preventing the pipe from falling off of the lugs as the arms 51 and 53 are pivoted and the lugs 121 are moved apart from each other. The position of the pipe on the lug with the sleeve 161 will remain fixed with respect to the sleeve while the sleeve 163 will rotate as the lugs move apart or together so that longitudinal movement of the pipe on the lugs will not occur.

It is to be understood that the lugs with the concentric sleeves of FIGS. 9–11 also may be employed for transferring pipe from the trough 31 to the rack at an upper level above the catwalk 63 although they will not have the advantages of the eccentric sleeves when indexed to the position shown in FIG. 6. In this usage, end plates 169 and 175 will not have their upward extensions 169A and 175A. The lugs with the concentric sleeves of FIGS. 9–11 also may be used for transferring pipe from an upper level of the rack (above catwalk 63) to the trough 31. In this instance a pair of ramps 191 will be attached to the side of the frame 29 of the apparatus 21 at the level of the catwalk 63 to facilitate removal of the pipe from the concentric sleeves onto the catwalk 63 and into the trough 31. In addition, the lugs with the concentric sleeves of FIGS. 9–11 may be employed for transferring pipe from a lower level of the rack (below catwalk 63) to the trough 31 although they will not have the advantages of the eccentric sleeves when indexed to the positions shown in FIG. 5.

The use of the lugs with the eccentric sleeves or with the concentric sleeves in combination with ramps 181 or 191 as described above have advantages in that transferring pipe from the rack to the trough or from the trough to the rack is made automatic resulting in less manpower needed and a safer transfer system.

Although the free ends 51C and 53C of the arms 51 and 53 are shown facing outward in opposite directions, it is to be understood that their pivot axes 55 and 57 could be moved further apart and the arms 51 and 53 located such that their free ends 51C and 53C face each other. The pair of arms on the right of the apparatus could be modified in the same manner.

It is to be understood that the pair of arms on the right of the apparatus also will employ lugs similar to that shown in FIGS. 4-8 or FIGS. 9-11. The right side of the frame 29 has vertical slots 201 and 203 for receiving the lugs on the right pair of arms to allow the arms to be moved to their lower most positions.

The catwalks 63 and 75 have raised central portions 63A and 75A whereby the collars or thread protectors at the ends of the pipe do not engage the catwalks when the pipe is rolled across the catwalks. This insures that the pipe will roll straight across the catwalks if the diameter of the thread protector or collar at one end of the pipe is larger than that at the other end.

It is to be understood that the pipe transfer system comprising the arms 51 and 53 could be used with other types of pipe handling machines other than the one described in connection with FIGS. 1-3. Although the pipe transfer system comprising the arms 51 and 53 preferably is intended for use on an offshore or ocean platforms it is to be understood that it could be used in other facilities, for example, in a pipe storage yard. In this situation, it would be used in connection with simply pipe storage rather than in connection with well drilling.

Preferably a pair of gates will be provided which will be removably connectable to the pair of rails supporting the uppermost row of pipe (as shown in FIG. 3) of the rack to prevent the upper row of pipe from rolling off of the rack except when pipe is being unloaded from the upper row or loaded thereon. Referring to FIGS. 14 and 15, one of the gates 211 will be described. It comprises a pair of arms 215 and 217 which are pivotally coupled to the rail shown (147A) on each side thereof by a removable bolt 219. The rails preferably are hollow tubes square in cross-section. The arms 215 and 217 are fixedly connected together by a pin 221. The arms of the gate can be moved to a nearly upright position as shown in solid line in FIG. 14 to a horizontal position as shown in dotted line in FIG. 14. In the upright position, the pin 221 engages the end of the rail and prevents the arm from moving further clockwise thereby preventing the pipe from rolling off of the top pair of rails. In the horizontal position, the upper edge of the arms are level with the top surface of the rails thereby allowing pipe to roll off of or onto the rails. A coil spring 223 is wound around the end of the bolt 219 and has one end 223A which engages the under edge of arm 215 and one end 223B which engages the underside of the rail. The spring 223 normally urges the arms of the gate in the upright position thereby preventing the pipe from rolling off of the top pair of rails. When moving the arms 51 and 53 upward to the upper pair of rails, a pin 225 extending from the lug 121 will engage the lower edge of arm 217 and move the arms of the gate to a horizontal position as shown in FIG. 14. The upward travel of the arms 51 and 53 will terminate at that point and pipe can be rolled from the top rail onto the lugs 121 or vice versa.

Preferably a solid insert is inserted in the end of each of the rails to provide increased strength at the end of the rails to prevent the ends from bending as the pipe is rolled onto or from the rails. A solid insert is identified in dotted form at 227 in FIG. 14. The insert may be removable and when inserted in place the bolt 219 will extend through an aperture formed through the insert.

The gate 211 may be removed from the end of the rail by removing bolt 219. As the stack of pipe in the rack is built up or reduced, the gates will be attached only to the ends of the rails upper pair of rails. For example, in FIG. 3, a gate 211 is shown attached to the end of the rail 147A of the upper pair of rails. A similar gate 211 will be attached to rail 147B and a pin similar to pin 225 will be attached to the other lug 121. In transferring pipe from the rack to the trough, when all of the pipe is unloaded from the rails 147A and 147B and these rails removed, the gates 211 will be removed from their rails and attached to the ends of the rails 146A and 146B.

When loading pipe onto or removing pipe from a row of pipe below catwalk 63 whereby the arms 51 and 53 have to move down the embodiment of the gate of FIGS. 26 and 27 will be employed. The gate 211 is the same as shown in FIGS. 14 and 15 except that a tab 228 will be connected to arm 215. In this usage, tab 230 will not be employed. The lugs 121 is shown located on the side of the gate next to arm 215. A rod 229 is attached to the lug 121 such that as the lug 121 goes down past the gate 211, the end 229A of rod 229 will engage tab 228 and move the arms level with the top of the rail 147A at which point the lug 121 will stop. A similar gate will be attached to the other rail 147B and a rod similar to rod 229 will be attached to the other lug.

Figure 25:
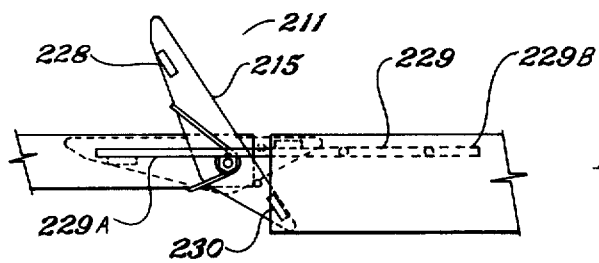
FIGS. 25 and 26 illustrate another embodiment of the gate of FIGS. 14 and 15.
Figure 26:
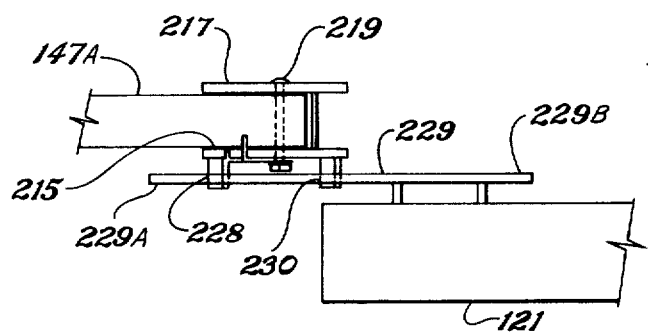

The embodiment of FIGS. 25 and 26 also may be used to load pipe onto or remove pipe from a row of pipe above the catwalk 63 by attaching tab 230 to the arm 215 and reversing the position of rod 229 on lug 121 whereby end 229B can engage tab 230. As the lug moves upward, end 229B will engage tab 230 and move the arms level with the rail 147A at which point the lug 121 will stop. A tab similar to tab 230 will be attached to the other gate of rail 147B and the rod 229 of the other lug reversed in position on the lug. Tabs 230 will be employed only in this usage.

The racks 27 now will be described in detail. The description will be made with respect to the rack 27 on the left in FIGS. 1 and 3 although it is to be understood that the rack 27 on the right will be the same. Each stanchion 135 and 137 comprises two parallel upright members providing a vertical slot or space for slidingly receiving the rails. In FIG. 1, the two parallel upright members of stanchion 135 are identified at 135A and 135B and the two parallel upright members of stanchion 137 are identified at 137A and 137B. Referring to FIG. 20, stanchion 135 is shown in more detail. The vertical slot or space between members 135A and 135B is identified at 231. In FIG. 1, the vertical slot or space between stanchion members 137A and 137B is identified at 232. The rear ends of members 135A and 135B have L-shaped strips 233 and 235 secured along their lengths providing a cross-slot 237. Each rail has a cross member 239 secured to its rear end adapted to slidingly fit in the cross-slot 237. The rear ends of stanchion members 137A and 137B have similar L-shaped strips secured thereto forming a cross-slot for receiving the rear cross member of its rails. The rails can be inserted into the vertical slots of the stanchion members and removed therefrom through the open tops. The purpose of the L-shaped strips 233 and 235 and the cross members 239 of the rails is to prevent longitudinal movement of the rails once they are in the stanchion slots. In stacking pipe on the rack 27, the rails may be inserted into the stanchion slots as each row or tier of pipe is completed. In removing pipe from the rack, the rails are removed from the stanchion slots as each row or tier of pipe is removed from the rack.

Preferably the rails are square tubing which will not rotate and which will separate the rows of pipe sufficient such that upset pins, collars, and thread protectors of each row of pipe can be separated sufficiently such that they will not interfere with the lower row of pipe as pipe is rolled along the rails. Since the rails are vertically movable, different diameter pipe can be stored in different rows as needed. The ends of the rails have vertical apertures 241 formed therethrough whereby straps 151 may be inserted and tied to the upper and lower rails as shown in FIG. 22 or to the upper rail and to the lower I-Beams as shown in FIG. 3 to prevent the pipe from rolling off. Instead of straps, rods may be inserted through the apertures. The rack has particular usefulness on drilling ships and on jack-up rigs where the drilling platform is in motion and the pipe must be secured at all times to prevent it from shifting and causing danger.

Figure 23:
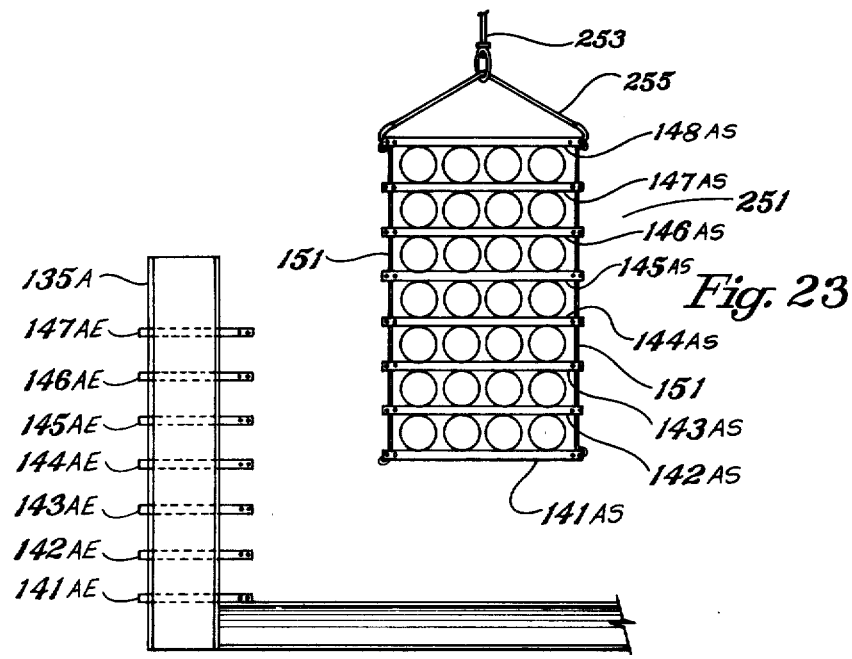
FIG. 23 illustrates a module of pipe secured together with rails and straps and which is being lowered for placement on a rack.

On many offshore platforms, two drilling rigs are employed each capable of drilling twenty-one wells in a grid pattern, seven in one direction and three in the other direction. Usually the wells are drilled about 7½ feet apart. When one well is drilled, the rig is moved over 7½ feet to drill another well. As shown in FIG. 3, the apparatus 21 is mounted on wheels 247 which are adapted to roll along I-Beams 131 and 133. This allows the center line of the apparatus 21 (along the trough 31) to be positioned along the center line of the rig or well as the rig is moved 7½ feet to the side to a new well site. In order to allow the apparatus 21 to be moved sideways along I-Beams 131 and 133, provision must be made to allow the stack of pipe in racks 27 to be readily moved to provide room for the apparatus. This is accomplished by allowing the stack of pipe in the racks to be located, stored, and removed in modules. One such module is shown at 251 in FIG. 23. It comprises a plurality of rows of pipe supported by a plurality of rows of pairs of rail sections having their ends tied together by straps or rods 151. In FIG. 23, one half of each pair of rail sections are identified by reference numerals 141AS, 142AS, 143AS, 144AS, 145AS, 146AS, 147AS and 148AS. The other half of each pair of rail sections (141BS, 142BS, 143BS, 144BS, 145BS, 146BS, 147BS and 148BS) are not shown. Rail sections 141AS and 148AS will be strong enough to carry the weight of the module 251. The length of each rail section is 7½ feet to match the distance between well sites. The module of pipe may be located on or removed from the I-Beams 131 and 133 by a crane or hoist having its lift line 253 coupled to lines 255 (only one shown) which are attached to the module 251. In FIG. 3, two such modules are shown making up the stack of pipe on the rack 27 on the left. The bottom rail 141A is not shown although it and rail 141B will be present if the stack is formed by locating modules of pipe on the I-Beams 131 and 133. In FIG. 3, the top rail 148A and 148B have been removed to allow removal of the top row of pipe. In FIG. 3, each rail is formed by two 7½ feet rail sections removably connected together and by an end section removably connected to one of the 7½ feet rail sections. The end sections are adapted to slidingly fit in a vertical stanchion slot. In FIG. 23, the end sections adapted to fit in the slot 231 of stanchion 135 are identified at 141AE, 142AE, 143AE, 144AE, 145AE, 146AE, and 147AE. They are shown spaced apart in FIG. 23 to illustrate the positions they will have when connected to the 7½ feet rail sections. The end sections (141BE, 142BE, 143BE, 144BE, 145BE, 146BE and 147BE) adapted to fit in the slot 232 of stanchion 137 are not shown. End section 142AE is shown in FIGS. 19 and 20. All of the end sections are the same as end section 142AE. FIG. 21 illustrates the manner in which two 7½ feet rail sections are removably connected together. Rail sections 142AS are illustrated. A solid insert 261 is removably located in both rail sections 142AS which in turn are connected to the insert by bolts 263. Although not shown, each rail section has two horizontal apertures formed through each end for receiving the bolts 263. In addition, each insert 261 has four horizontal apertures formed therethrough for receiving the bolts 263. FIG. 20 illustrates the manner in which a rail end section and a 7½ feet rail section are connected together. A solid insert 261 is removably located in the ends of rail end section 142AE and 7½ feet rail section 142AS which in turn are connected to the insert by bolts 263. The horizontal apertures formed through rail end section 142AE for receiving the bolts 263 are illustrated in FIG. 19 at 264. Thus in FIG. 3, each rail is made up of two 7½ feet rail sections and a rail end section.

In forming the stack on the left of FIG. 3, a module of pipe 251 is located by crane on the rails 131 and 133 near the stanchions 135 and 137 with the 7½ feet rail sections in alignment with the stanchion slots 231 and 232. The straps 151 on the left of the module 251 are removed. The rail end sections are inserted in the stanchion slots 231 and 232 with the inserts 261 located in the ends of the rail end sections. The inserts may then be pulled outward a short distance to the right and partially located in the ends of the 7½ feet rail sections. The module may then be moved to the left by the crane to abutt the left ends of the 7½ feet rail sections against the ends of the rail end sections and the bolts 263 employed to connect the 7½ feet rail sections and the rail end sections with the inserts. Instead of having single holes formed through the 7½ feet rail sections and through the rail end sections for each bolt 263, elongated slots may be formed therethrough to facilitate location of the bolts through the holes formed through the inserts.

The straps 151 on the right of the first module 251 next are removed and inserts 261 are located in the right ends of its rail sections. The second module of pipe 251 then is located by a crane on the rails 131 and 133 to the right and near the first module with the respective rail sections of the two modules in alignment. The straps 151 on the left of the second module 251 are removed. The inserts located in the right ends of the rail sections of the first module may then be pulled outward a short distance to the right and partially located in the left ends of the rail sections of the second module. The second module may then be moved to the left by the crane to abutt the left ends of its rail sections against the right ends of the rail sections of the first module and the bolts 263 employed to connect together the abutting rail sections of the two modules.

As shown in FIG. 21, each insert 261 has two vertical apertures 265 in alignment with the vertical apertures 241 of the rail sections. If it is desired to remove pipe only from the right module of the left rack 27 in FIG. 3, a rod may be inserted through the apertures 241 of the right end rail sections of the first module and through the apertures 265 of the inserts. As pipe is removed from the rows of the right module, its rail sections will be disconnected from the rail sections of the left module and removed.

If it is desired to remove the right module of the left rack of FIG. 3 to provide room to move the apparatus 21 to the left in line with the center line of a new well, the following procedure is followed. The bolts 263 connecting the left and right modules together are removed and the crane is employed to move the right module to the right a distance sufficient to allow the inserts to be removed. Straps 151 then are inserted through the apertures 241 at the left ends of the rail sections of the right module and the module moved to a new position. Straps 151 also will be inserted through the apertures 241 at the right ends of the rail section of the left module.

The use of the modules 251 also has advantages since they can be prepackaged, loaded on trains or boats with cranes and transported wherever needed. On offshore drilling platforms, cranes on the platforms can unload them from the boats onto the platforms or racks where needed.

Thus the use of the modules 251 has advantages in that it results in a reduction of manual labor, the saving of a great deal of time, and increased efficiency of operation.

Although the rail sections forming each module were described as having a length of 7½ feet, it is to be understood that they could have other lengths depending upon the distance between adjacent wells.

I claim:

1. A storage apparatus for holding lengths of pipe or the like comprising:
    a pair of vertical stanchions secured in place in spaced relation,
    a plurality of pairs of horizontal rails for supporting a plurality of rows of pipe, each said rail having first and second ends,
    each said pair of rails being adapted to be coupled to said pair of stanchions respectively such that each pair of rails is at a different level and said plurality of pairs of rails from two vertical rows of rails,
    each said vertical rows of rails being coupled at said first end to one of said stanchions,
    each said pair of rails being adapted to support a row of pipe and to be supported by a lower row of pipe, and
    each said stanchion comprising structure which acts as a guide to allow said rails coupled thereto to be moved upward or downward to different levels, and
    each said stanchion comprising two parallel upright members providing a vertical slot for slidingly receiving said first end of said rails, and a guide means for preventing horizontal movement of said rails beyond said guide means.

2. The storage apparatus according to claim 1 further comprising:
    a connecting means for connecting together each said vertical row of rails at said second ends for preventing pipe from being removed from between adjacent pairs of rails.

3. The storage apparatus according to claim 1 wherein,
    each said rail includes a hollow tubular member having a square cross-section and a structure mounted on said tubular member engageable with said guide means to prevent horizontal movement of said rail out of said guide means.

4. The storage apparatus according to claim 1 wherein,
    each said rail comprises at least two horizontally-alignable rail members removably coupled together,
    each said rail member lying in a common vertical plane being of equal length, and
    a coupling means on said rail members for removably coupling adjoining rail members together.

5. The storage apparatus according to claim 4 wherein,
    each said rail member coupling means includes a lug member having two ends, said ends being simultaneously insertable in openings in aligned adjacent ends of said rail members, and
    a securing means for securing said inserted lug member in each said aligned rail member ends.

6. The storage apparatus according to claim 1 wherein,
    each said rail comprises at least two horizontally-alignable rail members removably coupled together, each said rail member lying in a common vertical plane being of equal length, and a coupling means on said rail members for removably coupling adjoining rail members together, and
    said rail members aligned in a common vertical plane are couplable at both their ends to prevent pipe from rolling out and said coupling means is uncouplable whereby a separate pipe holding apparatus is formed.

7. The storage system according to claim 1 further comprising:
    a pair of gate structures adapted to be removably coupled to the upper pair of rails of said vertical row of rails respectively at said second ends,
    each said gate structure having first and second positions, and a means operatively connected to each said structure for adjusting said structure between said first and second positions, said first position preventing pipe from rolling off said upper pair of rails and said second position allowing pipe to roll off of and onto said upper pair of rails, and wherein,
    each said gate structure comprises at least one arm pivotally coupled to said second end of said rail and a holding means for holding each said arm in a position such that it extends above said rail whereby each said gate structure is in said first position,
    each said arm being movable to a position such that it does not extend above its rail whereby said gate structure is in said second position, and
    each said arm includes a portion engageable with a pipe rack loading system disposed adjacent said storage apparatus, whereby when said loading system engages said portion said gate structure is placed in said second position and when said loading system disengages said portion and said gate structure returns to said first position.

8. The storage apparatus according to claim 1 further comprising:
    a pair of rail structures supporting the lowermost said pair of said rails, said rail structures providing guide means along which a pipe handling apparatus positioned adjacent said storage apparatus may be moved.

9. The storage apparatus according to claim 2 wherein,
    said connecting means interconnects at least three vertically adjacent ends allowing the middle ends to slide along said connecting means between upper and lower adjacent ends.

10. A storage apparatus for holding lengths of pipe or the like comprising:
   a pair of vertical stanchions secured in place in spaced relation,
   a plurality of pairs of horizontal rails for supporting a plurality of rows or pipe, each said rail having first and second ends,
   each said pair of rails being adapted to be coupled to said pair of stanchions respectively such that each pair of rails is at a different level and said plurality of pairs of rails form two vertical rows of rails,
   each said vertical rows of rails being coupled at said first end to one of said stanchions,
   each said pair of rails being adapted to support a row of pipe and to be supported by a lower row of pipe,
   each said stanchion comprising structure which acts as a guide to allow said rails coupled thereto to be moved upward or downward to different levels,
   each said rail comprising at least two horizontally-alignable rail members removably coupled together,
   each said rail member lying in a common vertical plane being of equal length, and
   a coupling means on said rail members for removably coupling adjoining rail members together,
   said rail members aligned in a common vertical plane are couplable at both their ends to prevent pipe from rolling out and said coupling means are uncouplable whereby a separable pipe holding apparatus is formed.

11. The storage apparatus according to claim 10 wherein,
   each said rail member coupling means includes a lug member having two ends, said ends being simultaneously insertable in openings in aligned adjacent ends of said rail members, and a securing means for securing said inserted lug member in each said aligned rail member ends.

12. A storage system according to claim 10 further comprising:
   a pair of gate structures adapted to be removably coupled to the upper pair of rails of said vertical row of rails respectively at said second ends,
   each said gate structure having first and second positions, and a means operatively connected to each said structure for adjusting said structure between said first and second positions, said first position preventing pipe from rolling off said upper pair of rails and said second position allowing pipe to roll off of and onto said upper pair of rails,
   each said gate structure comprises at least one arm pivotally coupled to said second end of said rail and a holding means for holding each said arm in a position such that it extends above said rail whereby each said gate structure is in said first position,
   each said arm being movable to a position such that it does not extend above its rail whereby said gate structure is in said second position,
   each said arm includes a portion engageable with a pipe rack loading system disposed adjacent said storage apparatus, whereby when said loading system engages said portion said gate structure is placed in said second position and when said loading system disengages said portion said gate structure returns to said first position.

13. The storage apparatus according to claim 10 further comprising:
   a pair of rail structures supporting the lowermost said pair of said rails, said rail structures providing a guide means along which a pipe handling apparatus positioned adjacent said storage apparatus may be moved.

14. The storage apparatus according to claim 10 wherein,
   said connecting means interconnects at least three vertically adjacent ends allowing the middle ends to slide along said connecting means between upper and lower adjacent ends.

15. A storage apparatus for holding lengths of pipe or the like comprising:
   a pair of vertical stanchions secured in place in spaced relation,
   a plurality of pairs of horizontal rails for supporting a plurality of rows of pipe, each said rail having first and second ends,
   each said pair of rails being adapted to be coupled to said pair of stanchions respectively such that each pair of rails is at a different level and said plurality of pairs of rails from two vertical rows of rails,
   each said vertical rows of rails being coupled at said first end to one of said stanchions,
   each said pair of rails being adapted to support a row of pipe and to be supported by a lower row of pipe,
   each said stanchion comprising structure which acts as a guide to allow said rails coupled thereto to be moved upward or downward to different levels,
   a pair of gate structures adapted to be removably coupled to the upper pair of rails of said vertical row of rails respectively at said second ends,
   each said gate structure having first and second positions, and a means operatively connected to each said structure for adjusting said structure between said first and second positions, said first position preventing pipe from rolling off said upper pair of rails and said second position allowing pipe to roll off of and onto said upper pair of rails,
   each said gate structure comprises at least one arm pivotally coupled to said second end of said rail and a holding means for holding each said arm in position such that it extends above said rail whereby each said gate structure is in said first position,
   each said arm being movable to a position such that it does not extend above its rail whereby said gate structure is in said second position,
   each said arm includes a portion engageable with a pipe rack loading system disposed adjacent said storage apparatus, whereby when said loading system engages said portion said gate structure is placed in said second position and when said loading system disengages said portion said gate structure returns to said first position.

16. The storage apparatus according to claim 15 further comprising:
   a connecting means for connecting together each said vertical row of rails at said second ends for preventing pipe from being removed from between adjacent pairs or rails.

17. The storage apparatus according to claim 16 wherein,
   said connecting means comprises rods connecting said second ends of said rails.

18. The storage system according to claim 15 wherein,
said holding means includes a spring attached to said arm.

19. The storage apparatus according to claim 15 wherein,
said connecting means is removably attached whereby as additional rail members are added said connecting means can be moved to the uppermost rail member.

20. The storage apparatus according to claim 15 wherein,
each said gate structure is actuated by pipe loading lugs.

21. The storage apparatus according to claim 15 further comprising:
a pair of rail structures supporting the lowermost said pair of rails, said rail structures providing a guide means along which a pipe handling apparatus positioned adjacent said storage apparatus may be moved.

22. The storage apparatus according to claim 15 wherein,
said connecting means interconnects at least three vertically adjacent ends allowing the middle ends to slide along said connecting means between upper and lower adjacent ends.

23. A storage apparatus for holding lengths of pipe or the like comprising:
a pair of vertical stanchions secured in place in spaced relation,
a plurality of pairs of horizontal rails for supporting a plurality of rows of pipe, each said rail having first and second ends,
each said pair of rails being adapted to be coupled to said pair of stanchions respectively such that each said pair of rails is at a different level and said plurality of pairs of rails from two vertical rows of rails,
each said vertical rows of rails being coupled at said first end to one of said stanchions,
each said pair of rails being adapted to support a row of pipe and to be supported by a lower row of pipe,
each said stanchion comprising structure which acts as a guide to allow said rails coupled thereto to be moved upward and downward to different levels, and
a pair of rail structures supporting the lowermost said pair of said rails, said rail structures providing a guide means along which a pipe handling apparatus positioned adjacent said storage apparatus can be moved.

24. The storage apparatus according to claim 23 further comprising:
a connecting means for connecting together each said vertical row of rails at said second ends for preventing pipe from being removed from between adjacent pairs of said rails.

25. The storage apparatus according to claim 24 wherein,
said connecting means interconnects at least three vertically adjacent ends allowing the middle ends to slide along said connecting means between upper and lower adjacent ends.

26. A storage apparatus for holding lengths of pipe or the like comprising:
a pair of vertical stanchions secured in place in spaced relation,
a plurality of pairs of horizontal rails for supporting a plurality of rows of pipe, each said rail having first and second ends,
each said pair of rails being adapted to be coupled to said pair of stanchions respectively such that each pair of rails is at a different level and said plurality of pairs of rails form two vertical rows of rails,
each said vertical row of rails being coupled at said first end to one of said stanchions,
each said pair of rails being adapted to support a row of pipe and to be supported by a lower row of pipe,
each said stanchion comprising structure which acts as a guide to allow said rails coupled thereto to be moved upward or downward to different levels, and
a connecting means for connecting together each said vertical row of rails at said second ends for preventing pipe from being removed from between adjacent pairs of rails, said connecting means interconnecting at least three vertically adjacent ends allowing the middle ends to slide along said connecting means between upper and lower adjacent ends and said rails to move vertically in a level, horizontal manner.

27. The storage apparatus according to claim 26 wherein,
said connecting means comprises straps connecting said second ends of said rails.

28. The storage apparatus according to claim 26 wherein,
said connecting means comprises rods connecting said second ends of said rails.

* * * * *